…

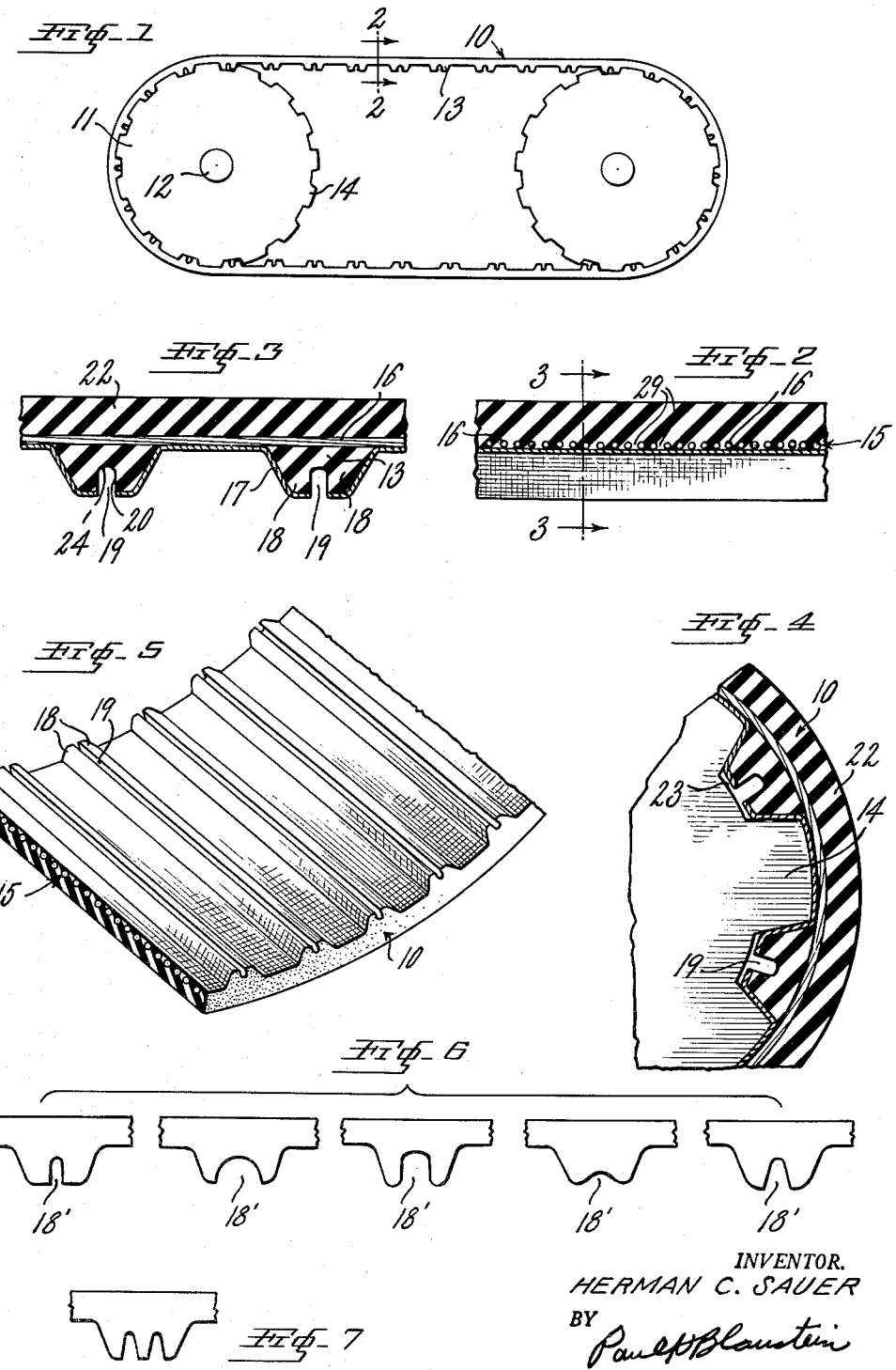

United States Patent Office 2,988,925
Patented June 20, 1961

2,988,925
TOOTHED BELT WITH GROOVED TEETH
Herman C. Sauer, Ambler, Pa., assignor to United States Rubber Company, New York, N.Y., a corporation of New Jersey
Filed Oct. 19, 1959, Ser. No. 847,125
1 Claim. (Cl. 74—229)

My invention relates to a positive drive transmission comprising a rubber belt or similar material having a plurality of equally spaced teeth and more particularly is an improvement over the positive drive described in the patent to Richard Y. Case, No. 2,507,852.

The Case patent discloses a positively geared power transmission belt having soft resilient rubber teeth bonded to a thin strain resisting member having one surface located substantially at the bottom of the whole depth of the teeth. The strain resisting member, sometimes referred to in the art as the load carrying band or tension member is substantially inextensible under the working loads of the belt for which it is designed.

As used herein, the term "dedendum line" in respect to the belt teeth is the line which marks the bottom of the whole line of teeth.

It has been found that the positive drive belt described in the aforementioned patent has certain disadvantages at high power operations. The primary disadvantage is that a high whining noise develops making it impossible for people to work near the positive drive belt in operation. Attempts to silence such a noise would involve enclosing the entire power transmission system with a noise dampening box which would be cumbersome, expensive and obviously unsatisfactory. While this high whining noise is itself a substantial problem, it is also symptomatic of improper performance indicating the existence of some type of interference between the belt teeth and pulley. It has also been found that small irregularities, such as exist in the dimensions of mold grooves used to form the belt teeth as well as the pulley grooves (which are exceedingly difficult to avoid in practice), are partially responsible for improper mating between the belt teeth and pulley, necessarily producing interference. It has also been found that belt wear increases with the amount of interference, thereby decreasing the service life of the belt.

Any imperfection can decrease the service life of the belt considerably since the driving pulley is composed of a hard substance, usually a metal. And when metal rubs against rubber or fabric, it is the rubber or fabric which is damaged and wears. At high speeds, both the metal pulley and the belt will wear, however the belt will wear to a greater extent.

It is, therefore, a primary object of this invention to provide satisfactory operation of the positive drive at high power operations by eliminating or curtailing the high whining noise accompanying high power operations.

Another object is to increase the service life of the positive drive belt by reducing the wear and the amount of heat that constantly develops as the belt and pulley surfaces rub against each other.

Still another object is to increase belt flexibility while the teeth of the belt and pulley mesh together and to reduce wear of the pulley groove walls thus preventing backlash and interference.

A final object is to dissipate the air trapped during operation in the clearance in the pulley grooves.

I have found that the above objects may be accomplished with surprising ease and simplicity by providing each of the tooth bodies of the positive drive belt with a transverse groove at the base thereof. This groove has the effect of making the belt tooth more resilient so that it may conform better to the contour of the mating pulley groove.

Other objects and a clearer understanding of this invention may be had by referring to the drawings in which:

FIG. 1 shows a positive drive belt mounted on driving and driven pulleys according to this invention;

FIG. 2 shows a cross-section view along 2—2 of FIG. 1;

FIG. 3 shows a longitudinal sectional view of the positive drive belt along 3—3 of FIG. 2;

FIG. 4 shows an enlarged sectional view of the positive drive belt as it is wound around the pulley member showing the clearance and groove position;

FIG. 5 shows a perspective view of a high-power positive drive belt showing a rather wide cross-section;

FIG. 6 shows various shapes of transverse grooves that may be used in accordance with this invention; and FIG. 7 shows a tooth having more than one transverse groove in the base.

Referring now to FIG. 1, there is shown a positive drive belt which flexes around driving pulley 11, which is mounted on rotatable power means 12. The positive drive belt has a plurality of equally spaced belt teeth which are bonded to the belt and also includes a load-carrying member located just above the top of teeth 13. Each tooth 13 has a transverse groove 19 therein. Except for this groove, the construction of this transmission belt and drive is essentially that described in the patent to Richard Y. Case No. 2,507,852.

A fabric jacket 17 is shown covering the base surface of the positive drive belt and defines the other contour of teeth 13. However, the surfaces of the groove wall 20 are shown bare and are not covered by said jacket. The transverse groove thereby cuts the jacket and extends upward from the base of the tooth beyond the jacket and substantially into the tooth body but not to a depth touching any strand of the load carrying band.

As shown, the belt 10 is endless and is provided with a load-carrying band 15 comprising a plurality of wire-windings or turns 16 of continuous strand, preferably of high tensile strength wire. The load-carrying member carries substantially the entire working load imposed upon the belt and in practice, is substantially inextensible.

I have found that during operation at high power loads, the interference between belts and pulley has substantially decreased. I am sure of this because the usual whining sound which accompanies interference is less pronounced and the belt has exhibited a longer service lifetime. I am not certain as to the entire theory relating to this improved performance, but I believe that the groove 19 causes tooth flanks 18 to be more resilient and flexible. That is, during operation, tooth flanks 18 may bend toward or away from each other with greater facility since they may move to some extent into the groove; in this way, tooth 13 may adapt itself more easily to the positions it finds itself in during operation since its flanks are not restrained. Sometimes during extended operation of this belt, the tooth 13 may tend to occupy the same position as some portion of a pulley tooth 14. Since the flanks of the teeth 17 are now capable of yielding they may flex to adapt themselves to the situation confronting them.

Of course, various shapes of the groove can be used as shown at 18' at FIG. 6. However, the corners of the tooth groove, or to put it somewhat differently, the walls of the tooth groove should be rounded as shown at 24 to prevent cracks in the groove bottom and causing premature belt failure.

Another reason for the decrease in interference and increase in lifetime of the belt may be explained by referring to FIG. 4. There is shown a slight clearance 23 between the belt tooth 13 and the upper surface of the pulley tooth groove 25. During operation without the groove 19, some heat is generated in this area and air tends to be entrapped and heated within this small clearance volume. During an extended period of operation, the heated air causes pressure substantially confined in this volume and tends to interfere with the smooth positive action of the belt. That is, the air in this small clearance is forced to move with great velocities or shocks and may be responsible for some frequency portion of the whining noise. By providing a relatively large groove volume or groove space 19, the air is not entrapped in clearance volume 23 and may, therefore, escape with relative ease.

Those skilled in the art may readily make a positive drive belt as defined by this patent by using their own skill, or following the methods described in such patent. Further, the positive drive belt may be made by the methods set forth in the Case patent or in the patent application filed by William A. Skura, Serial No. 795,547 on February 25, 1959 or in the patent application filed by myself, Serial No. 795,548 on February 25, 1959.

Serial No. 795,547 and Serial No. 795,548 disclose methods of making a positive drive belt by arranging the endless load carrying band of the belt and a layer of tooth forming plastic or rubber around the interior or exterior peripheral surface of a mold having tooth cavities therein in such a manner that the band is interposed between the plastic and the mold cavities. The tooth forming plastic, a specially compounded plastic, becomes relatively fluid under heat and pressure and is forced through the band into the tooth cavities to mold the belt teeth and bond them to the band in a single operation and also provides a cover over the load carrying tension members.

In these application of a tooth jacket, a layer of stretchable fabric, is interposed between the load carrying band and the surface of the mold containing the tooth cavities, and the fabric is forced by and ahead of the plastic coming through the band into the tooth cavities to mold the belt teeth and bond them to the band in a single operation.

The plastic layer may be formed of the following rubber compound:

| Ingredients: | Parts |
|---|---|
| Neoprene rubber GRT (solid) | 85.00 |
| Neoprene rubber FB (liquid) | 15.00 |
| Stearic acid | .50 |
| Light magnesium oxide | 7.00 |
| Anti-oxidant | 2.00 |
| Carbon black | 55.00 |
| Zinc oxide | 2.00 |
| Low molecular wgt. polyethylene | 6.00 |
| Mercaptobenzothiazole | .75 |
| Total | 173.25 |

The above compound should have a Mooney plastometer reading with the large rotor of 30–40 at 212° F., after being mixed on a mill or in a Banbury mixer in the usual manner. The neoprene rubber FB (liquid), and the low molecular weight polyethylene in the above compound imparts to the compound the necessary flow characteristics, to cause it to become relatively liquid when heated below the vulcanizing temperature so that it can be forced through the convolutions 29 of the load carrying band. When the vulcanization is completed, the rubber has the required hardness for the belt teeth, a durometer A reading of from 75–80.

The elongation of the fabric should be 60% to insure that the fabric will completely conform to the shape of the grooves without undue strain or rupture. The fabric also is preferably stretchable in only one direction.

I have made satisfactory belts by cutting the grooves 19 in each tooth body with a circular saw. That is, I provide a conventional positive drive belt as described in the aforementioned Patent No. 2,507,852 and cut laterally into the tooth body to form the grooves 19.

I have found that I may conveniently cut groove 19 into the tooth body by using a circular saw in a vertical position and then providing a horizontal platform over which a fixture may move so as to be close to the rotating saw. I then place the belt in this fixture so that the tooth surface is exposed. That is, the belt would be lying horizontally face down, the tooth bottom being horizontal so that the bottom of the tooth is closest to the saw. I then move the fixture, carrying the belt, so that the tooth body is within the path of the rotating saw whereby a groove 19 may be cut.

Of course, many modifications of this method, both with respect to the types of fixtures used and the types of saws or numbers of such saws used may readily occur to those skilled in the art. Further, it is possible to eliminate the groove cutting operation and to also provide a fabric jacket along the surfaces 20 of the groove wall by making a mold having a plurality of equally spaced protrusions in the bottom of the tooth cavity which forms the base of tooth 18 so that the grooves 19 are molded into the teeth in the curing operation. This may be easily accomplished in the patent applications aforementioned.

Belts with large teeth which are used for transmitting heavy loads by these methods may also be provided with two or more grooves in each tooth to obtain sufficient resiliency as shown at FIG. 7.

Further, various modifications in the particular types of tension members or the particular belt materials may occur to those skilled in the art since there are many materials which can provide the necessary flexibility in this type of belt.

In this regard the term "rubber" is used herein to designate natural and/or synthetic rubber compositions, and organic plastics having similar physical characteristics, and mixtures of such rubber compositions and other compatible organic plastics.

Also, other modifications may occur to those skilled in the art and while I have set forth a detailed description of my invention, I wish to be limited only by the scope of my claim and not by the particular embodiment which I have disclosed.

Having thus described my invention, what I claim and desire to protect by Letters Patent is:

A high power positive drive transmission system comprising an endless flexible rubber belt having a plurality of equally spaced teeth positioned along the driving surface thereof, a substantially inextensible load carrying band comprising helically wound strands within said belt and located substantially at the dedendum line thereof, pulleys having equally spaced grooves adapted to drive and be driven by said belt, the teeth of said belt being constructed to mesh with the pulley grooves, said mesh providing for a slight clearance volume, a fabric jacket along the driving surface of said belt, a transverse groove cutting said jacket and extending upwards from the base of each tooth beyond the jacket and substantially into the tooth body but not to a depth touching any strand of the load carrying band, said transverse groove and slight clearance volume communicating when said belt and pulley mesh, whereby air entrapped in said clearance volume may flow into said transverse groove, the wall bounding said groove being continuous and rounded at the uppermost part bounding said groove.

References Cited in the file of this patent

UNITED STATES PATENTS

| 2,186,180 | Sloman et al. | June 9, 1940 |
| 2,281,148 | Freedlander | Apr. 28, 1942 |
| 2,507,852 | Case | May 16, 1950 |
| 2,625,828 | Nassimbene | Jan. 20, 1953 |
| 2,941,413 | Huber et al. | June 21, 1960 |

FOREIGN PATENTS

| 999,236 | France | Oct. 3, 1951 |